(12) United States Patent
Bontenbal

(10) Patent No.: US 9,974,319 B2
(45) Date of Patent: May 22, 2018

(54) PARTIALLY NEUTRALIZED POLYCARBOXYLIC ACIDS FOR ACID-SANDING

(75) Inventor: Elize Willem Bontenbal, Wageningen (NL)

(73) Assignee: PURAC BIOCHEM B.V., Gorinchem (NL)

( * ) Notice: Subject to any disclaimer, the term of this patent is extended or adjusted under 35 U.S.C. 154(b) by 2210 days.

(21) Appl. No.: 11/723,883

(22) Filed: Mar. 22, 2007

(65) Prior Publication Data

US 2007/0231455 A1    Oct. 4, 2007

Related U.S. Application Data

(60) Provisional application No. 60/786,840, filed on Mar. 29, 2006.

(51) Int. Cl.
*A23G 3/54*    (2006.01)
*A23G 3/34*    (2006.01)

(52) U.S. Cl.
CPC ............... *A23G 3/54* (2013.01); *A23G 3/343* (2013.01); *A23G 3/346* (2013.01); *A23G 2200/00* (2013.01); *A23V 2002/00* (2013.01)

(58) Field of Classification Search
USPC .......................................... 426/289
See application file for complete search history.

(56) References Cited

U.S. PATENT DOCUMENTS

| | | | | |
|---|---|---|---|---|
| 2,178,569 | A | * | 11/1939 | Ferguson ............... 426/548 |
| 3,082,091 | A | * | 3/1963 | Smith et al. ............ 426/96 |
| 5,425,961 | A | * | 6/1995 | Yatka et al. .......... 426/3 |
| 5,527,542 | A | | 6/1996 | Serpelloni et al. |
| 5,792,473 | A | * | 8/1998 | Gergely et al. ........ 424/466 |
| 2002/0122842 | A1 | | 9/2002 | Seielstad et al. |
| 2003/0026878 | A1 | * | 2/2003 | Corriveau et al. ...... 426/289 |
| 2008/0286388 | A1 | * | 11/2008 | Shiao ................... 424/728 |

FOREIGN PATENT DOCUMENTS

| | | |
|---|---|---|
| JP | A 05-097664 | 4/1993 |
| JP | A-08-089174 | 4/1996 |
| JP | A-2000-342214 | 12/2000 |
| JP | A-2003-000157 | 1/2003 |
| JP | A-2004-173641 | 6/2004 |
| JP | A-2005-160402 | 6/2005 |
| JP | A-2005-519613 | 7/2005 |
| WO | WO 97/06695 * | 2/1997 |
| WO | 97/15201 A1 | 5/1997 |
| WO | WO 97/15201 A1 | 5/1997 |
| WO | WO 03/077667 A2 | 9/2003 |
| WO | WO 2004/012534 A1 | 2/2004 |

OTHER PUBLICATIONS

Jungbunzlauer, Monosodium citrate, p. 1, http://www.jungbunzlauer.com/products/applications/products/special-salts/special-citrates/monosodium-citrate/general-information.html Mar. 12, 2006. Date verified by http://web.archive.org, p. 1.*
Igoe et al, Dictioanry of Food Ingredients 3rd Edition Chapman and Hall 1996, pp. 63, 81, and 82.*
Igoe et al, Dictionary of Food Ingredients 3rd Edition Chapman and Hall 1996, p. 127.*
Rogers, Paul. Helping the Medicine Go Down, The Candy Industry May 2001, pp. 37-40.*
Igoe et al, Dictionary of Food Ingredients 3rd Edition Chapman and Hall 1996, p. 128.*
Sep. 5, 2011 Notice of Reasons for Rejection issued in Japanese Application No. 2009-502074. pp. 1-4.
Oct. 24, 2012 Office Action issued in Japanese Patent Application No. 2009-502074. pp. 1-3.

* cited by examiner

*Primary Examiner* — Kelly Bekker
(74) *Attorney, Agent, or Firm* — Oliff PLC

(57) ABSTRACT

A powder acid-sanding composition for confectionery products having partially neutralized polycarboxylic acid selected from malic acid, citric acid, fumaric acid, adipic acid, and mixtures thereof, and at least one of a sugar and sweetener. The partially neutralized polycarboxylic acid improves the stability in terms of acid migration into the candy and moisture uptake from the environment. Also, a method for acid-sanding of confectionery products using the powder acid-sanding composition, and the products obtained thereby. The obtained acid-sanded confectionery products have an improved shelf life and an immediately felt sour taste being of a constant strength at bringing it in the mouth and digesting it.

7 Claims, No Drawings

PARTIALLY NEUTRALIZED POLYCARBOXYLIC ACIDS FOR ACID-SANDING

This nonprovisional application claims the benefit of U.S. Provisional Application No. 60/786,840, filed Mar. 29, 2006.

This invention relates to a composition for acid-sanding of confectionery products comprising a partially neutralized polycarboxylic acid selected from malic acid, citric acid, fumaric acid, and/or adipic acid and to a method for said acid-sanding of confectionery products. Further, the invention comprises the confectionery products with an acid-sanding comprising said partially neutralized polycarboxylic acid.

Sanding of confectionery products consists of making fine crystals (the sanding) adhere to the surface of the confectionery products by moistening said products beforehand with relatively dry steam or with a hot solution of a adhering agent such as for example gum arabic or a carbohydrate syrup as described in U.S. Pat. No. 5,527,542.

The moistened products are then contacted with the sanding mixture. Said contacting can be done in various ways as described in prior art. An example is a rotating pan in which the confectionery products are mixed with the sanding composition. Another generally applied process is to spray or sprinkle the sanding composition over the moistened candies. The sanded candies are subsequently dried. This can also be done in various ways as known to the person skilled in the art.

Confectionery products that are very suited for sanding are for example hard candies as lolly-pops gelatin-based or starch-based soft candies. Further, chewing gum, toffees, jelly-beans and the like can also be used in acid-sanding applications.

In general the state of art refers to sugar-sanding and/or acid-sanding. Sugar sanding is directed to application of a sugar sanding on confectionery products wherein said sugar sanding not necessarily comprises acidulants in contrast to acid-sanding compositions.

The main objective of an acid-sanding process is to provide confectionery products like candies that have an instant sour taste when brought into the mouth. Further, this sour taste should stay at a constant strength during the digestion of the candies. The sour taste can be generated by using acid-sanding compositions comprising acidulants as for example citric acid, malic acid, lactic acid, fumaric acid, adipic acid, and tartaric acid. These acids are well-known food acids used in confectionery for various purposes. Malic acid, citric acid, lactic acid and fumaric acid are applied for acid-sanding purposes.

When used for acid-sanding, said acids are in general applied directly in the acid form. The acid in powder form is then mixed with sugar crystals in order to create a sanding composition. A commonly known alternative hereto is to use coated or encapsulated acids as described in for example US 2002/0122842 which is directed to chewing-gum applications.

The food acids may be coated with a fat or starch layer or with an oil composition after which the coated products are mixed with the other acid-sanding components.

The application of the acids in free form or in coated/encapsulated form have however several disadvantages.

Acids as citric acid, malic acid and lactic acid are hygroscopic. Due to this uptake of moisture direct application of these acids in their acid form for acid-sanded candies will result in sticky and unattractively wet-looking candies with reduced sour taste.

Further, soft-candies as e.g. gelatin or starch-based candies contain to up about 10% water. Consequently, the hygroscopic acids will partially migrate into the candies resulting in a lower concentration of acid at the surface of the candy leading to a loss in strength of the directly sensed sour taste at introducing the candy into the mouth.

Application of coated or encapsulated organic acids in acid-sanding solves the above described problems of moisture uptake and acid migration as the coating would form a barrier around the hygroscopic acid. WO 2004/012534 describes coated or encapsulated crystalline lactic acid. Said coated lactic acid is next to coated malic acid often used for acid-sanding applications.

Prior art describes various types of coating or encapsulation. Fats, starches or other carbohydrates are often used as coating or encapsulation layers in confectionery applications. US 2002/0122842 describes the coating or encapsulation or acids by polyvinyl acetate, which is a rubbery synthetic polymer, for chewing gum applications.

Coated or encapsulated acids have however the disadvantage that there is no instant or immediate acid release at the surface of the acid-sanded candy when bringing the candy into the mouth since a prolonged time is required for first dissolving the coating or encapsulation layer. This coating or encapsulation agents used further often negatively influence taste and/or texture of the sanding or of the candy itself. Another disadvantage is that the coating or encapsulation layer often partly is destroyed in the process of mixing the sugar with the coated acids to form the acid-sanding composition. Consequently the coating looses its functionality.

On top of this, the process of coating or encapsulation of acids is complex and requires additional auxiliary materials and expensive equipment as for example spray driers or extruders. As a result coated and encapsulated acids are relative expensive for use in acid-sanding applications.

The present invention provides a solution to above-mentioned problems. The invention increases the shelf life of acid-sanded confectionery products significantly. The present invention also results in acid-sanded confectionery products with an immediately felt sour taste and of a constant strength at bringing it in the mouth and digesting it. Said products do not contain any taste or texture influencing and expensive coating or encapsulation agents. The present invention further results in soft-candies as e.g. gelatin or starch-based candies with a stable constant acid profile at the surface of the acid-sanded candies.

Hereto, the present invention is directed to a powder acid-sanding composition comprising partially neutralized polycarboxylic acid and at least one of a sugar and sweetener.

The expression "partially neutralized polycarboxylic acid" means that in the polycarboxylic acid at least one carboxylic acid group is neutralized and that at least one carboxylic acid group is in the free acid form. Said neutralized carboxylic acid group is in the salt form. An example hereof is the monosalt of malic acid such as e.g. sodium hydrogen malate, hereinafter also referred to as monosodium malate.

Thus a partially neutralized polycarboxylic acid can also be an acid with several carboxylic groups of which one or more groups are neutralized. An example are the mono- and di-salts of citric acid: e.g. sodium dihydrogen citrate (also referred to as monosodium citrate) has one neutralized carboxylic group and disodium hydrogen citrate (also referred to as disodium citrate) has two neutralized carboxylic groups.

The cation(s) in the partially neutralized polycarboxylic acid according to the invention, such as for example the above-mentioned mono- and di-salts of malic acid and citric acid is not limited to sodium but may also be for example potassium or another alkali metal or may be a divalent (e.g. calcium or magnesium) or trivalent cation.

When divalent or trivalent cations are used, respectively two and three carboxylic groups are neutralized by one cation.

It has been found that a partially neutralized acid has several functionalities: the acid group(s) provides a sour taste on the one hand and on the other hand the acid becomes more stable with respect to acid migration and moisture uptake due to the presence of said neutralized acid group(s). This combination of functionalities makes the acid very suited for use in acid-sanding of confectionery products. As a result an acid-sanding composition comprising such a partially neutralized polycarboxylic acid also was found to be more stable while providing the desired sour taste sensation.

Complete neutralization of the polycarboxylic acid is possible. In prior art, use is often made of for example sodium citrate. As is commonly known, sodium citrate is used to refer to the completely neutralized citric acid, i.e. sodium tri-citrate, and thus not to partially neutralized citric acid. Complete neutralization will not render the dual functionality that is obtained with a partially neutralized polycarboxylic acid. The slightly acidic saliva in the mouth will be able to donate the acid protons needed to reverse neutralization and form acidic end groups resulting in a sour taste sensation in the mouth, but this will take a prolonged time. Depending on the neutralized polycarboxylic acid this may in some cases even take longer than the actual time needed for digestion. The desired instant sour taste introduced by a partially neutralized polycarboxylic acid will thus not be achieved.

JP 05-097664 describes a dry syrup composition comprising hydrochloric acid BIFEMERAN®, a wax, a water-insoluble nature coating agent and a corrigent. The corrigent may be for example sodium citrate, sodium tartrate, potassium hydrogen tartrate and sodium hydrogen succinate or sodium disuccinate. Both potassium hydrogen tartrate and sodium hydrogen succinate are partially neutralized carboxylic acids. The corrigent is used together with other components such as e.g. mannitol to mask the bitterness of hydrochloric acid BIFEMERAN®, which is a cerebral blood vessel nature neurologic manifestation improvement agent. Said agent is mixed with the corrigent and mannitol to form a powder which is subsequently coated with a wax and the water-insoluble coating agent.

In the present invention the partially neutralized polycarboxylic acid is selected from malic acid, citric acid, fumaric acid, adipic acid and mixtures thereof. It was found that above-mentioned acids in their partially neutralized form have very suitable characteristic taste profiles for application in acid-sanding of confectionery products. Further, it has been found that an acid-composition comprising one or several of above-mentioned partially neutralized acids is very stable in terms of hygroscopicity and acid migration.

Examples of above-mentioned partially neutralized polycarboxylic acids are the mono- and di-salts of malic and citric acid.

A preferred embodiment of the present invention is an acid-sanding powder composition comprising partially neutralized malic acid as for example monosodium malate or monopotassium malate. Said composition was found to have a very acceptable sour taste and an excellent stability. Dynamic Vapor Sorption (DVS) demonstrated that a composition comprising an alkali mono-salt of malic acid does not show any moisture uptake from the environment. The sour taste was experienced to stay constant even over three months and six months of storage.

Beside the mono-salt of malic acid, the mono- or di-salt of citric acid, particularly the sodium and potassium salts, and the acid-sanding composition comprising said mono- and di-salts showed a very stabile performance in terms of moisture uptake and acid migration resulting in a constant taste profile.

The acid-sanding composition according to the invention may further comprise lactic acid or a lactate salt and/or a combination hereof. The lactic acid may be present as encapsulated crystalline or liquid lactic acid or as lactic acid on a lactate carrier. This latter product is commercially available as PURAC Powder®55 or PURAC Powder®60 (hereinafter referred to as respectively PP55 and PF60).

Crystalline lactic acid and PP55 or PP60 have a stronger immediately sensed sour taste than the mono-salt of malic acid but said sour taste is not experienced to be as "long-lasting" as the mono-salt of malic acid. It was found that an acid-sanding composition comprising mono-salt of malic acid in combination with lactic acid or PP55 or PP60 provides an immediate and strong sour taste with a lingering effect.

Good results with respect to the taste sensation were further found in application of an acid-sanding composition comprising a combination of a mono-salt of malic acid with coated malic acid and/or fumaric acid. Coated malic acid and fumaric acid in combination with mono-salt of malic acid was found to give a very characteristic desired taste sensation. The same applied to above described composition further comprising lactic acid and/or P55 and/or PP60.

Beside the partially neutralized polycarboxylic acid and other above-mentioned components according to the invention, all conventional ingredients used in sanding of food products may be present in the sanding composition.

Depending on the confectionery products used for acid-sanding the weight-based ratio of sugar to acid in the acid-sanding composition may range from 99:1 to 55:45. Preferred is a sanding composition with a total acid content ranging from 3 up to 20 wt % on total sanding composition and most preferred is a content of between 5 and 12 wt % of total acid on sanding composition. Variation in the total acid content and in the type of acids used is of course dependent on the desired sour taste profile and strength. Each acid has its own strength and characteristic flavor.

The sugar used may be regular sugar as commonly used in confectionery but may also include the use of sweeteners as for example polyols (xylitol, maltitol, etc.) or aspartame. The term "sugar" herein means any mono- and di-sugar that is commonly used as sweetening agent. The amount of sugar and/or sweetener is 5 to 99 wt % of the composition. Often sugar is used with a particle size between 200 and 500 micron. The other components in the sanding composition as e.g. the acids will have a similar particle size in order to prevent segregation in the sanding composition. The powdery composition therefore has an average particle size of 200 to 500 micron, preferably 250 to 400 micron.

Further, agents with a specific functionality may be added to the sugar sanding composition as for example coloring agents or agents influencing taste, preserving agents, food fortification agents or adhering agents for better adherence of the sanding composition to the candy.

The present invention is further directed to a method for acid-sanding of confectionery products wherein said products are contacted with a hot solution comprising dry steam and/or an adhering agent after which said moistened products are contacted with an acid-sanding composition as described above.

It was found that the method of acid-sanding according to the invention is most suited for application on hard or soft candies. Examples of suited hard candies are lolly-pops and other sweets but also chewing gum is included.

Examples of soft candies are wine gums, sour worms, apple rings or peaches and marshmallows but also toffees and jelly-beans are included.

The hard candies obtainable via the acid-sanding method of the present invention proved to have a significantly increased shelf life. After three and also after six months of storage said candies showed no significant loss in sour taste while the appearance of the candies also stayed acceptable.

The soft candies and especially gelatin-based and starch-based soft candies were also found to have an increased shelf life. The candies showed no migration of acids from the surface of the candies into the core of the candies and the sour taste sensation remained constant over three and even six months of storage.

The following non-limiting examples illustrate the invention.

EXPERIMENT I

The migration of acids into soft-candies is qualitatively mimicked by measurement of the migration of acids in time in a gelatin-based gel on which an acid-sanding is sprinkled.

Gels were made by solving 84 grams of gelatin (250 Bloom) in 156 grams of water in a water bath at 80° C. A mixture of 342 grams of sugar and 512.4 grams of glucose syrup 42DE was added to 105.6 grams of water and mixed in a pan on a hot plate at 116° C. After mixing, the mixture was left to cool down to 80° C.

Said mixture was added to the gelatin solution and after mixing 0.6 grams of methyl red indicator were added and mixing was continued.

About 50 grams of the resulting mixture were put in a glass tube (Ø 3 cm), after which the tube was sealed off with a cap and the mixture left to dry for 1 day at room temperature.

After one day 0.4 grams of an acid-sanding mixture were sprinkled on top of the gels. Acid-sanding mixtures of the following compositions were used:
1. PURAC Powder® 55 (PP55) from PURAC Biochem B.V
2. Sodium hydrogen malate (hereinafter referred to as monosodium malate (MSM) or monomalate)
3. Encapsulated malic acid 95% (EMA) from Balchem, S-121. Coating consists of partially hydrogenated vegetable oil.
4. PP55+Encapsulated malic acid (weight based ratio 50:50).
5. Mono sodium malate+fumaric acid (Acros, MA&-019) (in weight based ratio 50:50).
6. Encapsulated citric acid 95% (ECA) from Balchem, S-167.
7. PP55+Encapsulated citric acid (weight based ratio 50:50).
8. Coated citric acid (CCA) from Raps, S-201. Coating consists of maltodextrin and guar gum.

The monosodium malate was made via crystallization as follows: In a 5 L beaker glass 1.08 Kg of malic acid (from Merck, 383) and 1.04 Kg of demi-water were mixed using a mechanical stirrer (IKA Rw20) followed by addition of 642 g of a 50%-sodium hydroxide solution. The temperature increased to about 70° C. The resulting solution was left to cool down to room temperature.

After cooling down the resulting suspension was centrifuged. The crystals were dried under air of 60° C.

After sprinkling the acid-sanding compositions (in duplo) on top of the gels, the tubes were closed with rubber caps. The acid-sanded gels were stored at 20° C./60% R.H. [=Relative Humidity] and at 35° C./70% R.H.

The acid migration was followed by visual observation of the change in color of the methyl red indicator present in the gels from yellow (at high pH) into red (at low pH). Said migration was followed during a couple of days of storage of the gels at different storage conditions and the results are shown in Table 1.1 and Table 1.2. The results are the average of duplicate samples.

TABLE 1.1

Acid migration (mm) in gelatin gels (Aw (water activity at 20° C.) of the gel is 0.74, storage conditions 20° C./60% (R.H.))

| Acid-sanding composition | Migration in mm after time in days | | | | |
|---|---|---|---|---|---|
| | 0 | 4 | 11 | 17 | 23 |
| PP55 | 0 | 0 | 1.5 | 2 | 2.5 |
| Monosodium malate | 0 | 0 | 0 | 0 | 0 |
| Encaps. Malic acid | 0 | 0 | 0 | 0 | 0 |
| PP55 + Encaps. Malic acid | 0 | 0 | 1.5 | 1.5 | 2 |
| Monosodium malate + fumaric acid | 0 | 0 | 0 | 0 | 0 |
| Encaps. Citric acid | 0 | 0 | 0 | 0 | 0 |
| PP55 + Encaps. Citric acid | 0 | 0 | 0.5 | 1 | 1.5 |
| Coated citric acid | 0 | 0 | 0 | 1 | 2 |

The results show that an acid-sanding comprising monosodium malate or a mixture of monosodium malate with fumaric acid is very stable at 20° C./60% R.H. There is no noticeable migration of the partially neutralized acid into the gelatins. In contrast hereto, a relative clear migration is observed of the acid-sandings comprising PP55 or coated citric acid.

TABLE 1.3

Acid migration (mm) in gelatin gels (Aw gel 0.74, storage conditions 35° C./70% R.H.)

| Acid-sanding composition | Migration in mm after time in days | | | | |
|---|---|---|---|---|---|
| | 0 | 4 | 11 | 17 | 23 |
| PP55 | 0 | 2 | 4 | 5 | 6 |
| Monosodium malate | 0 | 0 | 0 | 0 | 0 |
| Encaps. Malic acid | 0 | 1.5 | 2 | 3 | 4 |
| PP55 + Encaps. Malic acid | 0 | 2 | 3 | 4.5 | 6 |
| Monosodium malate + fumaric acid | 0 | 0 | 0 | 0 | 0 |
| Encaps. Citric acid | 0 | 0 | 0.5 | 1 | 1 |
| PP55 + Encaps citric acid | 0 | 0 | 2 | 2.5 | 4 |
| Coated citric acid | 0 | 0 | 2 | 2.5 | 3.5 |

The results show that at in an environment with higher relative humidity and with a higher temperature (35° C.; 70% R.H.) for all acid-sanding compositions a migration of the acid-sanding components into the gels is observed except for the acid-sanding composition that consists of monosodium malate or of a mixture of monosodium malate with fumaric acid. The acid-sanded gel comprising encapsulated citric acid shows a relatively low acid migration.

EXPERIMENT II

The stability of monosodium malate and the stabilizing influence of monosodium malate in an acid-sanding mixture further comprising a hygroscopic acid like lactic acid is demonstrated in the following experiment directed to the migration of hygroscopic acids into soft candies.

In the same manner as in the former experiment gelatin-based gels were made.

On top of the gels 0.25 grams of an acid-sanding composition were sprinkled. The acid-sanding composition consists of PURAC Powder® 55 and mono sodium malate, which was made in a similar way as described in experiment I. Two different weight-based ratios were used: a 70/30 wt % PP55/monosodium malate ratio and a 50:50 ratio.

The tubes with the acid-sanded gels were closed with rubber caps and stored at 20° C./60% R.H. and at 35° C./70% R.H.

The Tables below show the acid migration in the gelatin-based gels after storage. The results are the average of duplicate samples.

TABLE 2.1

Acid migration in gelatin-based gels (Aw (Water activity at 20° C.) of the gels 0.764, storage conditions 20° C./60% R.H.)

| | Migration in mm after time in days | | | | | | |
|---|---|---|---|---|---|---|---|
| Acid | 0 | 3 | 6 | 9 | 12 | 16 | 21 |
| PP55 | 0 | 0.0 | 1.0 | 2.5 | 2.3 | 2.5 | 2.5 |
| Monosodium malate | 0 | 0.0 | 0.0 | 0.0 | 0.0 | 0.0 | 0.0 |
| 70:30 ratio | 0 | 0.0 | 1.0 | 1.8 | 1.8 | 2.3 | 2.3 |
| 50:50 ratio | 0 | 0.0 | 0.0 | 1.0 | 1.0 | 1.3 | 1.3 |

TABLE 2.2

Acid migration in gelatin-based gels (Aw gel 0.764, storage conditions 35° C./70% R.H.)

| | Migration in mm after time in days | | | | | | |
|---|---|---|---|---|---|---|---|
| Acid | 0 | 3 | 6 | 9 | 12 | 16 | 21 |
| PP55 | 0 | 2 | 2 | 4 | 3.5 | 4 | 5.5 |
| Monosodium malate | 0 | 0 | 0 | 0 | 0 | 0 | 0 |
| 70:30 | 0 | 0 | 2 | 2 | 2.75 | 3 | 3.25 |
| 50:50 | 0 | 0 | 0 | 3 | 2.25 | 3 | 3 |

The results demonstrate the high hygroscopicity of PP55 in contrast to the stability of the acid-sanding comprising of 100% monosodium malate. The migration of the acids into the gels can be decreased by addition of monosodium malate to the acid-sanding as is demonstrated by the lesser degree of migration that was measured.

EXPERIMENT III

The stability of monosodium malate with respect to the uptake of moisture from the environment and the stabilizing influence of monosodium malate in a acid-sanding mixture further comprising a hygroscopic acid like lactic acid was also measured using the commonly known technique of Dynamic Vapor Sorption (DVS).

Table 3.1 below shows the composition of the mixtures that were analyzed.

Used were PURAC Powder® 55 (PP55) and PURAC Powder) 60 (PP60) from PURAC Biochem BV and mono sodium malate as made in a similar manner as described in Experiment I.

TABLE 3.1

Composition samples (percentages are weight based)

| Sample | PP60 (wt %) | PP55 (wt %) | Monosodium malate (wt %) |
|---|---|---|---|
| 1 | — | — | 100 |
| 2 | 50 | — | 50 |
| 3 | — | 50 | 50 |
| 4 | 70 | — | 30 |
| 5 | 30 | — | 70 |

Table 3.2. shows the results. The results in the "sorption" part of the DVS curve demonstrate that monosodium malate is very stable: it does not absorb water at all.

It is also demonstrated that with a higher concentration of monosodium malate present in the acid-sanding mixture that further comprises a hygroscopic acid, the stability of the mixture is increased resulting in a decrease of the rate and amount of moisture uptake. The presence of monosodium malate thus positively influences the shelf life of hard and soft candies with respect to both the appearance of the candy and the taste sensation of the candy.

TABLE 3.2

Results of the DVS analysis

| RH (%) | Change in mass sample 1 (%) | Change in mass sample 2 (%) | Change in mass sample 3 (%) | Change in mass sample 4 (%) | Change in mass sample 5 (%) |
|---|---|---|---|---|---|
| Start experiment (sorption part) | 0.0 | 0.7 | 0.2 | 0.7 | 1.6 |
| 0 | 0.0 | 0.0 | 0.0 | 0.0 | 0.0 |
| 10 | 0.0 | 0.2 | 0.0 | 0.2 | 0.0 |
| 20 | 0.0 | 0.2 | 0.0 | 0.3 | 0.1 |
| 30 | 0.0 | 0.3 | 0.0 | 0.6 | 0.2 |
| 40 | 0.0 | 0.6 | 0.0 | 0.9 | 0.3 |
| 50 | −0.1 | 0.9 | 0.1 | 1.4 | 0.4 |
| 60 | −0.1 | 1.4 | 0.1 | 2.0 | 0.7 |
| 70 | −0.2 | 2.5 | 0.4 | 3.7 | 1.7 |
| 80 | −0.1 | 23.9 | 12.7 | 31.2 | 16.2 |
| 90 | −0.1 | 56.3 | 52.5 | 69.3 | 42.7 |

EXPERIMENT IV

Acid-sanded soft candies comprising monosodium malate or monosodium malate in combination with PP55 were analyzed on taste by a taste panel. Two different types of soft candies were acid-sanded: starch based candies and gelatin based candies. The starch-based candies were sanded with 8.2% and 40 wt % acid powder in a further sugar comprising acid-sanding composition. The acid-sanding composition for the gelatin-based candies comprised 8.2 wt % acid.

Part of the candies was stored in a freezer directly after completion of the acid-sanding process (t=0). The other candies were stored for three months. The soft-candies with 8.2 wt % acid in the sanding mixture were kept an additional three months in storage.

The following materials were used:

Mono sodium malate (M.S.M.); product is made according to the method described below using malic acid (from Chemproha/Brenntag, in crystal form) and 50% sodium hydroxide (from Chemproha/Brenntag) and demiwater PURAC Powder® 55 from PURAC Biochem BV (PP55)

Gelatin-based soft candy

Starch-based soft candy

Sanding sugar and extra fine sugar

The mono sodium malate was made via crystallization as described below:

90 kg of malic acid were added to 86 kg of demi-water in a mixer at a temperature of 20 to 30° C. while stirring the solution. Some steam was used to solve all malic acid. About 53.7 wt % of sodium hydroxide solution was added to the mixer. The temperature increased to about 80° C. The solution was left overnight to cool down to room temperature during which mono sodium malate crystals were formed. The crystals were separated from the mother liquid by centrifuge and subsequently dried for approximately three hours in an oven of 60° C.

The soft-candies were acid-sanded according to the commonly known acid-sanding process wherein dry steam was used to moisten the candies prior to spraying the acid-sanding composition over the candies. Equal amounts of 'extra fine sugar' and 'sanding sugar' are used. The acid-sanding compositions further comprised the following different weight-based ratios of mono-sodium-malate and PURAC Powder® 55 (P55):

1. 100 wt % PP55
2. 70:30 wt % PP55: monosodium malate
3. 50:50 wt % PP55: monosodium malate
4. 30:70 wt % PP55: monosodium malate
5. 100 wt % monosodium malate Directly after production part of the candies was frozen in order to prevent or stop any acid migration and to have a representative reference at t=0. The other candies were stored at room temperature in a closed bag.

The candies were tested on taste by panellists trained on the same basic tastes in water. The candies at t=0 were compared in taste with the candies after three months of storage (t=3) and after six months after storage (t=6). The software program Compusense, which is a very commonly used tool for sensory evaluations as is known to the person skilled in the art, was used to perform the test and to analyze the results. The taste is expressed in values ranking from 1 (least) to 5 (most) sourness for the candies that were stored for three months and ranking from 0 (not sour) to 10 (very sour) for the candies that were stored during 6 months.

Table 4.1 shows the average results of the observed difference in taste of the candies at t=0 and the candies after three months of storage. Column 2 of the Table shows the weight-based ratio of PP55 to mono-sodium malate (MSM) that was used in the acid-sanding of the candies. Column 3 presents the number of panellists that selected the "fresh" candies at t=0 as being the most sour tasting candies compared to the candies that were stored for three months.

TABLE 4.1

Comparison taste test of t = 0 versus t = 3 months 'old' candies

| Type of candy | P255:MSM | Nr. of panellists t = 0 most sour |
|---|---|---|
| Sour worms, 8.2% acid in sanding | 100:0 | 10 of 11 |
| | 70:30 | 9 of 9 |
| | 50:50 | 11 of 11 |
| | 30:70 | 6 of 9 |
| | 0:100 | 6 of 11 |
| Sour Jacks, 8.2% acid in sanding | 100:0 | 10 of 11 |
| | 70:30 | 10 of 10 |
| | 50:50 | 8 of 11 |
| | 30:70 | 8 of 10 |
| | 0:100 | 5 of 11 |

As can be observed in above Table, the acid-sanded candies comprising solely PP55 as acid-component are experienced by the majority of the panellists to have a significant less sour taste after three months of storage compared to the same candies at t=0. The explanation can be found in the moisture that is taken up by the hygroscopic lactic acid of PP55 and that has consequently a diluting effect with respect to the sour taste of the candies.

In the case of a candy with solely monosodium malate as the acid-component in the acid-sanding composition, less panellists found the candies at t=0 the more sour than the candies that were stored for three months. Apparently, the presence of monosodium malate in the acid-sanding prevents' or stabilizes the uptake of moisture from the environment and thus the taste sensation is kept comparable after three months of storage to the taste of the fresh candies at t=0.

Table 4.2 shows the average results of the observed difference in taste of the fresh candies at t=0 and the candies after six months of storage.

TABLE 4.2

Results of taste test of t = 0 versus t = 6 months 'old' candies

| Type of candy | PP55:MSM. | Panellists selected t = 0 as most sour | Value on scale at t = 0 | Value on scale at t = 6 |
|---|---|---|---|---|
| Sour worms, 8.2% acid in sanding | 100:0 | 8 out of 8 | 8.6 | 5.5 |
| | 70:30 | 9 out of 11 | 6.6 | 4.7 |
| | 50:50 | 8 out of 8 | 6.7 | 3.1 |
| | 30:70 | 9 out of 10 | 6.4 | 4.6 |
| | 0:100 | 5 out of 8 | 6 | 5.5 |
| Sour Jacks, 8.2% acid in sanding | 100:0 | 9 out of 10 | 7.2 | 4.6 |
| | 70:30 | 9 out of 9 | 7.1 | 3.8 |
| | 50:50 | 8 out of 8 | 6.7 | 3.8 |
| | 30:70 | 9 out of 9 | 6.2 | 4.6 |
| | 0:100 | 6 out of 10 | 5.1 | 4.6 |

The results show that the candies comprising lactic acid in the form of PP55 in the acid-sanding have significantly lost their sour taste over six months of storage. The presence of monosodium malate is much better able to prevent this loss in taste and shows a stabilizing effect when looking at the taste expressed on a ranking scale from 0 to 10. This ranking shows a decreased difference in taste between the fresh and the stored candies as there is more monosodium malate present in the acid-sanding. In contrast hereto, the candies with an acid-sanding comprising sugar and solely monosodium malate do have a similar sour taste after six months of storage compared to the fresh candies.

The invention claimed is:

1. A composition comprising:
   1 to 45 wt % of a partially neutralized malic acid; and
   5 to 99 wt % of at least one of a sugar and sweetener,
   wherein:
   the composition is a powder acid-sanding composition,
   the partially neutralized malic acid and the at least one of a sugar and sweetener are present in the composition as separate and individual particles,
   a weight ratio of the at least one of a sugar and sweetener and the partially neutralized malic acid is 99:1 to 55:45, and
   the composition has an average particle size of from 200 to 500 microns.

2. The composition of claim 1, wherein the partially neutralized malic acid is selected from the group consisting of potassium hydrogen malate, sodium hydrogen malate, and mixtures thereof.

3. The composition of claim 1, further comprising lactic acid and/or calcium lactate.

4. The composition of claim 1, further comprising fumaric acid and/or coated malic acid.

5. A method for acid-sanding of confectionery products, comprising
   contacting said products with dry steam or a hot solution of an adhering agent to obtain a moistened product; and
   contacting the moistened products with the acid-sanding composition of claim 1.

6. An acid-sanded confectionery product having an acid-sanding comprising the composition of claim 1.

7. An acid-sanded confectionery product of claim 6, wherein said confectionery product is a hard or soft candy.

* * * * *